(12) United States Patent
McMinn et al.

(10) Patent No.: US 6,957,319 B1
(45) Date of Patent: Oct. 18, 2005

(54) INTEGRATED CIRCUIT WITH MULTIPLE MICROCODE ROMS

(75) Inventors: Brian D. McMinn, Buda, TX (US); James K. Pickett, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 309 days.

(21) Appl. No.: 10/369,966

(22) Filed: Feb. 19, 2003

(51) Int. Cl.[7] ................................. G06F 9/22
(52) U.S. Cl. ............... 712/205; 711/102; 712/211; 712/243
(58) Field of Search .................. 712/205, 211, 243; 711/102

(56) References Cited

U.S. PATENT DOCUMENTS

| | | | |
|---|---|---|---|
| 4,928,223 A * | 5/1990 | Dao et al. ............. | 712/247 |
| 5,321,845 A * | 6/1994 | Sawase et al. .......... | 712/37 |
| 5,502,827 A * | 3/1996 | Yoshida ............... | 712/244 |
| 5,559,975 A | 9/1996 | Christie et al. ......... | 712/230 |
| 5,796,973 A | 8/1998 | Witt et al. ............. | 712/208 |
| 5,796,974 A | 8/1998 | Goddard et al. ........ | 712/211 |
| 5,799,162 A | 8/1998 | Christie et al. ......... | 712/205 |
| 5,815,697 A * | 9/1998 | Bosshart et al. ........ | 712/236 |
| 6,035,386 A | 3/2000 | Christie et al. ......... | 712/205 |
| 6,351,801 B1 | 2/2002 | Christie et al. ......... | 712/205 |
| 2001/0052066 A1 * | 12/2001 | Lee et al. .............. | 712/248 |

* cited by examiner

Primary Examiner—Kenneth S. Kim
(74) Attorney, Agent, or Firm—Robert C. Kowert; Meyertons, Hood, Kivlin, Kowert & Goetzel, P.C.

(57) ABSTRACT

Integrated circuits having multiple independently accessible microcode ROMs. An integrated circuit may include a microcode unit and a plurality of microcode ROMs fabricated within the same integrated circuit. The microcode unit may be configured to receive a microcoded instruction and to identify a microcode routine that corresponds to the microcoded instruction. The microcode ROMs may collectively store the microcode routines that implement the microcoded instructions of a complex instruction set, and different microcode ROMs may have different access times. At least one of the microcode ROMs may output operations included in the microcode routine in response to the microcode unit identifying the microcode routine. Microcode routines having more performance criticality may be stored in a microcode ROM having a smaller access latency than the access latency of a microcode ROM in which microcode routines having less performance criticality are stored.

25 Claims, 5 Drawing Sheets

INTEGRATED CIRCUIT WITH MULTIPLE MICROCODE ROMS

BACKGROUND OF THE INVENTION

1. Field of the Invention

This invention is related to the field of integrated circuits, and more particularly, to storing and processing microcoded instructions within an integrated circuit.

2. Description of the Related Art

Instructions processed in an integrated circuit are encoded as a sequence of ones and zeros. For some processor architectures, instructions may be encoded with a fixed length, such as a certain number of bytes. For other architectures, such as the x86 architecture, the length of instructions may vary. The x86 integrated circuit architecture specifies a variable length instruction set (i.e., an instruction set in which various instructions are each specified by differing numbers of bytes). For example, the 80386 and later versions of x86 integrated circuits employ between 1 and 15 bytes to specify a particular instruction. Instructions have an opcode, which may be 1–2 bytes, and additional bytes may be added to specify addressing modes, operands, and additional details regarding the instruction to be executed. The x86 integrated circuit architecture is one example of an architecture having complex instructions that may be implemented in microcode.

Certain instructions within the x86 instruction set are quite complex, specifying multiple operations to be performed. For example, the PUSHA instruction specifies that each of the x86 registers be pushed onto a stack defined by the value in the ESP register. Thus, a PUSHA instruction specifies that a store operation be performed for each register and the ESP register may be decremented between each store operation to generate the address for the next store operation.

While it may be possible to implement hardware to execute any instruction directly, the cost of such implementation in terms of the number of transistors required and/or die area needed may be prohibitive in some cases. In the case of an instruction set like the x86 instruction set mentioned above, which is rich in complex instructions, the hardware required to execute all instructions directly may be enormous. In fact, current integrated circuit production methods may not be adequate to produce a single chip capable of executing all x86 instruction directly in hardware. Fortunately, other methods for executing complex instructions have been developed, such as decomposing a complex instruction, referred to as a microcoded instruction, into a set of more elementary operations, referred to herein as microcode. Microcode may be executed directly on hardware that is far less complex than that necessary to execute the complex instructions.

Microcoded instructions are transmitted to a microcode instruction unit within the integrated circuit, which decodes the complex microcoded instruction and produces two or more less-complex microcode operations for execution by the integrated circuit. The simpler microcode operations corresponding to the microcoded instruction are typically stored in a read-only memory (ROM) associated with the microcode unit. Thus, microcoded instructions are often referred to as microcode ROM (MROM) instructions.

Less complex instructions are typically directly decoded by hardware decode units within the integrated circuit. The terms "directly-decoded instruction", "fastpath instruction" or "non-complex instruction" may be used interchangeably herein to refer to an instruction that is decoded and executed by the integrated circuit without the aid of a microcode instruction unit. Directly-decoded instructions are decoded into component operations via hardware decode, without the intervention of a microcode instruction unit, and these operations are executed by functional units included within the integrated circuit.

An integrated circuit may decode or partially decode an instruction encoding to determine if an instruction is a fastpath instruction or an MROM instruction. If the instruction is an MROM instruction, the integrated circuit's microcode instruction unit retrieves the corresponding microcode routine from the integrated circuit's microcode ROM. Multiple clock cycles may be used to transfer the entire set of microcode operations within the ROM that correspond to the MROM instruction. Once the microcode operations are output from the microcode ROM unit, these operations are typically included within the operation stream that is dispatched to one or more devices that schedule operations for execution. Thus, typical microcode ROM units, in effect, perform instruction expansion on the microcoded instruction.

The microcode operations output from the microcode ROM may be elementary to the point that they can complete execution at a rate of one operation per execution cycle (clock cycle) of the processing or execution unit. In order to operate at maximum efficiency (maximum number of instructions executed per unit time), the execution unit may need to be supplied with elementary operations at a rate of one operation per clock cycle. This may become problematic when attempting to implement a integrated circuit capable of executing an instruction set rich in complex instructions (like the x86 instruction set) and at the same time having the highest possible clock speed, as described in more detail below.

Current technology enables the production of integrated circuits that may be run at speeds such that multiple clock cycles may be required to physically propagate a signal across the die. For example an integrated circuit may have a die size such that one dimension is 20 millimeters. The propagation time for signals across the die may be on the order of 30 mm/nanosecond (approximately one tenth the speed of light in vacuum). If the execution unit of such a processor is capable of being clocked at a rate of 6 GHz, then it may take as many as 4 clock cycles to propagate a signal across the die.

This propagation delay may be significant in the design of an integrated circuit's microcode ROM. As stated previously, an instruction set containing large numbers of complex-instructions (such as the x86 instruction set) may require that large amounts of microcode be stored in microcode ROM. This implies that a large portion of the integrated circuit's die area may be occupied by the microcode ROM. Typically, in order to access an operation contained in a microcode ROM, some other device generates the address for the line within the microcode ROM that contains the desired operations. The address signals propagate from the generating device to the microcode ROM. Logic within the microcode ROM decodes the address signals to activate the line containing the desired operation and the data from that line is made available at the output of the microcode ROM. For a microcode ROM that occupies a large area on the processor die, signal propagation delay as described above can result in a significantly greater delay in outputting data from a line whose memory elements are located far from the decode logic. Since only a single delay time is specified for data outputting, the time needed to make data available from the cells farthest from the decode logic sets the lower bound for the delay. The data signals must then propagate from the microcode ROM to the device that will make use of the data. The total time required to complete this process determines the speed at which the microcode ROM can be accessed.

It is typically desired that a microcode ROM have an access time of a small number (e.g., one or two) clock cycles in order to match the rate at which the ROM can output operations with the rate at which the operations are consumed by other components. A microcode ROM with enough capacity to store all the microcode routines of a complex instruction set may occupy such a large area on the processor die that it is incapable of the desired access time. If a microcode ROM cannot output operations at a rate that is greater than or equal to the rate at which the operations can be executed, the processor will operate at less than maximum efficiency.

SUMMARY

Various embodiments of methods and systems for implementing an integrated circuit that includes multiple independently accessible microcode ROMs are disclosed. In one embodiment, an integrated circuit may include a microcode unit and a plurality of microcode ROMs. The microcode unit may be configured to receive a microcoded instruction or an event triggering the execution of a microcode routine and identify a microcode routine that corresponds to the microcoded instruction. The microcode unit may be configured to identify which of the plurality of microcode ROMs stores the microcode routine. For example, the microcode unit may respond to receiving a microcoded instruction by generating the address of the first operation of the microcode routine corresponding to the microcoded instruction and the address may determine in which microcode ROM the microcode routine is stored. The microcode ROMs may collectively store the microcode routines that implement the microcoded instructions of a complex instruction set. At least one of the microcode ROMs may output operations included in the microcode routine in response to the microcode unit identifying the microcode routine. The scheduler may be configured to receive the operations from the plurality of microcode ROMs and forward them to the execution unit.

In some embodiments the physical characteristics (e.g., physical size, capacity, transistor feature size, access time, etc.) of the microcode ROMs may be identical, while in other embodiments they may differ. One microcode ROM may be implemented with transistors that have a different feature size (channel length) than the transistors used to implement one of the other microcode ROMs. One microcode ROM may consume a different amount of power (on average during operation) than one of the other microcode ROMs. One microcode ROM may be located farther from the scheduler than one of the other microcode ROMs. Differences in some of these physical characteristics may cause microcode ROMs on the same integrated circuit die to have different access times.

In some embodiments in which the access times of the microcode ROMs differ, fewer than all of the microcode routines may be stored in one of the microcode ROMs with the smallest access time. For example, in an integrated circuit with two microcode ROMs one of the microcode ROMs may have an access time of one clock cycle and the other microcode ROM may have an access time of two or more clock cycles. The microcode ROM with the access time of one clock cycle may not have a large enough capacity to store all of the microcode routines.

Microcode routines that are executed relatively infrequently and/or that tend to be executed at times in which microcode ROM performance does not control processor efficiency may be referred to as less performance-critical than microcode routines that execute with higher frequency and/or that tend to be executed during times in which microcode ROM performance is more likely to affect processor performance. If the microcode ROMs have different access times, various degrees of performance criticality may be assigned to each microcode routine and used to select the microcode ROM in which each microcode routines is stored. Microcode routines that are less performance critical may be stored in a microcode ROM having a slower access time than a microcode ROM in which microcode routines that are more performance critical are stored. For example, some microcode routines may only be executed during initialization of the integrated circuit. These microcode routines may be stored in a microcode ROM that has a relatively slow access time.

In some embodiments, at least one of the microcode ROMs may have an access time of one clock cycle. The scheduler may receive operations from the microcode ROM having an access time of one clock cycle at a rate of at least one operation per clock cycle. The execution unit may receive operations from the scheduler at a rate of at least one operation per clock cycle and may complete the execution of the operations at a rate of at least one operation per clock cycle.

Various embodiments of a method may involve: receiving a microcoded instruction; identifying one of a plurality of microcode routines corresponding to the microcoded instruction; retrieving the microcode routine by accessing the identified one of the microcode ROMs, where each of the microcode ROMs is independently accessible; and executing the microcode routine.

BRIEF DESCRIPTION OF THE DRAWINGS

A better understanding of the present invention can be obtained when the following detailed description is considered in conjunction with the following drawings, in which.

Figure 1:
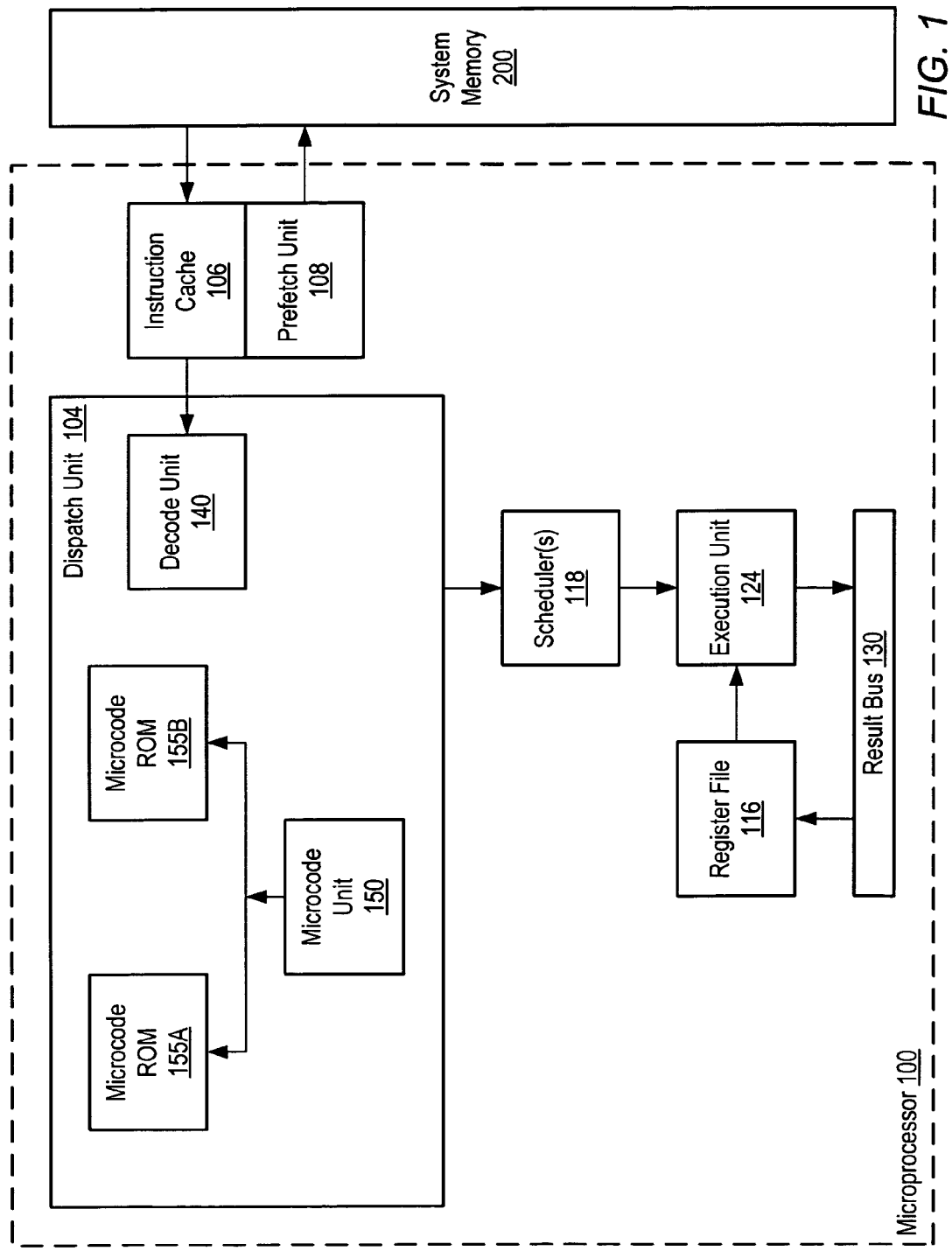
FIG. 1 illustrates a microprocessor that includes multiple microcode ROMs, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must). The term "include" and derivations thereof mean "including, but not limited to." The term "connected" means "directly or indirectly connected," and the term "coupled" means "directly or indirectly coupled."

DETAILED DESCRIPTION OF EMBODIMENTS

FIG. 1 is a block diagram of logical components included in a microprocessor 100, according to one embodiment. Microprocessor 100 may be implemented as a single integrated circuit. Microprocessor 100 may include a microcode unit 150 and multiple independently accessible microcode ROMs 155. Microprocessor 100 is configured to execute instructions stored in a system memory 200. In some embodiments, the microprocessor 100 may be designed to be compatible with the x86 architecture. Note that microprocessor 100 may also include and/or be coupled to many other components in addition to those shown here. Additionally, the interconnections between logical components may vary between embodiments.

Microprocessor 100 may include an instruction cache 106. Microprocessor 100 may include a prefetch unit 108 coupled to the system memory 200. Prefetch unit 108 may prefetch instruction code from the system memory 200 for storage within instruction cache 106. In one embodiment, prefetch unit 108 may be configured to burst code from the system memory 200 into instruction cache 106. Prefetch unit 108 may employ a variety of specific code prefetching techniques and algorithms. Prefetch unit 108 may also fetch instructions from instruction cache into dispatch unit 104. Instructions may be fetched from system memory 200 in response to a given address missing in instruction cache 106.

A dispatch unit 104 may be configured to receive instructions from instruction cache 106. Dispatch unit 104 is an example of a means for receiving a microcoded instruction. The dispatch unit 104 may include a decode unit 140 to decode instructions received from instruction cache 106. The dispatch unit 104 may also include a microcode unit 150 for use when handling microcoded instructions.

The dispatch unit 104 is configured to dispatch operations to scheduler(s) 118. One or more schedulers 118 may be coupled to receive dispatched operations from dispatch unit 104 and to issue operations to execution unit 124. Execution unit 124 is an example of a means for executing operations. Results generated by execution unit 124 may be output to a result bus 130. These results may be stored to register file 116. An execution unit 124 may be configured to complete the execution of one elementary operation in one clock cycle, in one embodiment.

Instruction cache 106 may temporarily store instructions prior to their receipt by dispatch unit 104. Instruction code may be provided to instruction cache 106 by prefetching code from the system memory 200 through prefetch unit 108. Instruction cache 106 may be implemented in various configurations (e.g., set-associative, fully-associative, or direct-mapped).

Dispatch unit 104 may output signals including bit-encoded operations executable by the execution unit 124 as well as operand address information, immediate data and/or displacement data. Decode unit 140 may be used to decode certain instructions into one or more operations executable within execution unit 124. Simple instructions may correspond to a single operation. More complex instructions may correspond to multiple operations. Upon receiving an operation that involves the update of a register, the dispatch unit 104 may reserve a register location within register file 116 to store speculative register states (in an alternative embodiment, a reorder buffer may be used to store one or more speculative register states for each register).

Dispatch unit 104 may include a microcode unit 150. Microcode unit 150 may handle microcoded instructions detected within the instruction stream input to dispatch unit 104. Microcode unit 150 may also output microcode routines in response to the occurrence of events (e.g., exceptions) that trigger the execution of a microcode routine. Microcode unit 150 may include and/or be coupled to multiple microcode ROMs 155 that collectively store the microcode routines corresponding to each microcoded instruction. Dispatch unit 104 may decode or partially decode an instruction encoding to determine if an instruction is a fastpath instruction or an MROM instruction. If the instruction is a microcoded instruction or if an event triggering a microcode routine is detected, microcode unit 150 may generate an entry point corresponding to that instruction or event. Generating entry points is an example of identifying one of a plurality of microcode routines corresponding to a microcoded instruction or event, and thus microcode unit 150 is an example of a means for identifying which microcode routine corresponds to an event or a microcode instruction. Entry point generation may involve determining which of the ROMs 155 stores the corresponding microcode routine. In some embodiments, entry point generation may involve mapping or translating some or all of the instruction encoding to a microcode ROM address for a location in one of the microcode ROMs 155 at which the corresponding microcode routine begins. This mapping may be performed by a lookup table, content-addressable memory, combinatorial logic, or any other mechanism for translating the MROM instruction encoding to a ROM address. For example, microcode ROMs 155A and 155B may collectively have a capacity of 3K. The microcode unit may map an MROM instruction encoding to a 12-bit ROM address in the range 0x0000–0xBFF according to where the beginning of the microcode routine for that MROM instruction is located. In such an embodiment, one or more bits of the address may identify which microcode ROMs 155 store that routine. The ROM address is sent to an address decoder for the appropriate ROM 155 and the address decoder selects the addressed ROM entry. The microcode instruction at the selected ROM entry is transferred out of the ROM to be executed. The ROM address may be incremented to the next microcode operation in the routine. Also, some microcode operations may indicate a jump to a non-sequential address in the microcode ROM. Multiple clock cycles may be used to transfer the entire set of microcode operations within the ROM that correspond to the MROM instruction.

Different microcoded instructions may require differing numbers of microcode operations to effect their corresponding functions. Additionally, the number of microcode operations corresponding to a particular microcode ROM instruction may vary according to the addressing mode of the instruction, the operand values, and/or the options included with the instruction. It is noted that the microcode operations may be defined within the instruction set, or may be customized for the particular microprocessor on which the microcode routines are to execute.

The microcode ROMs 155A and 155B may be independently accessible. Each of the ROMs 155 may contain circuitry for driving data onto an interconnection with other processor components independently from any of the other microcode ROMs. Each of the ROMs may be accessed through one or more address and/or control lines, which may not be shared with any of the other microcode ROMs.

By including more than one microcode ROM, the average time required to retrieve microcode operations may be decreased relative to the time required to retrieve operations from a single microcode ROM with a storage capacity equal to the combined storage capacities of microcode ROMs 155. This reduction in access time may arise from the decreased size of at least one of the microcode ROMs 155 relative to the size of a single ROM that would otherwise be required to store all of the microcode routines. Accordingly, when accessing instructions from at least one of the multiple microcode ROMs 155, microprocessor 100 may be able to operate at greater efficiency than microprocessor 100 would if only a single microcode ROM were implemented.

In some embodiments, microcode ROMs 155 may have the same access time. In such an embodiment, each microcode ROM 155 may have a faster access time than a single ROM having a capacity equal to the combined capacity of the ROMs 155. For example, the access time of each microcode ROM 155 may be one clock cycle, while the access time of a single ROM having a capacity equal to the total capacity of ROMs 155 may be two or more clock cycles.

In other embodiments, at least some of microcode ROMs 155 may have different access times. As mentioned previously, at least one of the microcode ROMs 155 may have an access time that is less than the access time of a single ROM having the same capacity as microcode ROMs 155. The access times of the different microcode ROMs 155 may vary due to differences in various characteristics (e.g., capacity, power consumption, proximity to microcode unit 150 and/or scheduler 118, etc.) as described in more detail below.

In embodiments in which microcode ROMs 155 have different access times, microcode unit 150 may be configured to access each ROM 155 according to its particular access timing. For example, if ROM 155A has an access time that is shorter than the access time of ROM 155B, microcode unit 150 may be configured to assert ROM access requests more frequently to ROM 155A. Similarly, when accessing microcode routines in the slower ROM 155B, microcode unit 150 may insert NOPs into the stream of operations being dispatched to scheduler 118 during cycles in which data is not available at the output of the slower ROM 155B. In contrast, the access timing of the faster ROM 155A may be such that microcode unit 150 inserts fewer or no NOPs into the output stream of ROM 155A.

Once microcode operations have been retrieved from a microcode ROM 155, the microcode instruction unit 150 may dispatch the microcode operations to one or more schedulers 118. Scheduler 118 is an example of a means for receiving operations from one of a plurality of microcode ROMs. The microcode operations are thereafter issued and executed in a similar fashion to other decoded operations. In some embodiments, execution unit 124 may be configured to receive operations from scheduler 118 at a rate of at least one operation per clock cycle and may be capable of completing execution of the operations at a rate of at least one operation per clock cycle. Scheduler 118 may be configured to issue operations to execution unit 124 at a rate of at least one operation per clock cycle and may be configured to receive operations from at least one of microcode ROMs 155 at a rate of at least one operation per clock cycle. In such embodiments, microprocessor 100 may be able to operate at maximum efficiency when accessing operations from at least one of the microcode ROMs 155 at a rate of at least one operation per clock cycle.

Physical Parameters of Integrated Circuit ROMs

There may be many physical factors associated microcode ROMs 155 that may result in the microcode ROMs 155 having differing access times from each other and/or from a single ROM having a capacity equal to the combined capacity of the ROMs 155. For example, the physical size (area of integrated circuit die occupied) of a microcode ROM 155 may be proportional to the capacity of the microcode ROM 155. A microcode ROM 155 may be implemented as a two-dimensional array of cells with each cell capable of storing one or more bits of information. As the capacity (number of bits capable of being stored) of the microcode ROM 155 increases so may one or both of the dimensions of the array. As stated previously, the access time of a microcode ROM 155 may be limited by the time required to output data from the cells that are located farthest from the address decode logic. As the size of the array increases, so may this output time. Therefore, the access time of a microcode ROM 155 may be proportional to the capacity of the microcode ROM.

Another physical factor that may cause the access time of a microcode ROM 155A to be greater than the access time of a microcode ROM 155B may be the relative proximity of the microcode ROMs 155 to the integrated circuit component that receives the microcode operations, e.g., a scheduler 118. If microcode ROM 155A is located farther from the scheduler than microcode ROM 155B, the time required to propagate control and data signals to and from the scheduler may be longer for microcode ROM 155A than for microcode ROM 155B. This may cause microcode ROM 155A to have a longer access time than microcode ROM 155B.

The maximum switching speed for a transistor may be inversely proportional to the length of the channel that connects the source to the drain. This length may be referred to as the feature size of the transistor. In some cases, the transistors used to implement a microcode ROM 155A may have a larger feature size than those used to implement a microcode ROM 155B. The larger feature size for transistors used to implement microcode ROM 155A may cause microcode ROM 155A to have a longer access time than microcode ROM 155B.

The amount of operational power consumed by a microcode ROM 155 may be proportional to the rate at which the transistors used to implement the microcode ROM are switched. The rate at which the transistors are switched may be inversely proportional to the access time for the microcode ROM 155. Typically, the amount of supply power available to each component of the integrated circuit is limited. If the amount of power allocated to a microcode ROM 155 is below a certain level, the microcode ROM may be constrained to operate with a longer access time than would be the case if more power were available.

Microcoded Instruction Set

By examining the microcoded instructions of a complex instruction set such as the x86 instruction set, it may be determined that there is a broad range of execution frequencies among the microcode routines, and that some of the microcode routines are executed infrequently relatively to most other microcode routines. An example of an infrequently executed microcode routine may be a microcode routine that is executed only upon initialization.

Other microcode routines may tend to be executed at times when factors other than how quickly the microcode routine can be accessed determine processor efficiency. An example of this type of microcode routine may be a microcode routine that executes in response to a page fault. In this case a required memory page may not be resident in system memory 200 and the page may need to be accessed from a backup store, such as a disk drive. The latency associated with this type of page access may be greater than that of multi-cycle accesses to a microcode ROM 155. Therefore, the execution time for this type of microcode routine may not be the determining factor in processor efficiency or system performance during the time in which it is executed.

Microcode routines that are executed relatively infrequently and/or that tend to be executed at times in which microcode ROM 155 performance does not control processor efficiency are referred to herein as being less performance-critical than microcode routines that execute with higher frequency and/or that tend to be executed during times in which microcode ROM 155 performance is more likely to affect processor performance. In embodiments in which microcode ROMs 155 have different access times, various degrees of performance criticality may be assigned to each microcode routine and used to select the microcode ROM 155 in which each microcode routines is stored. For example, microcode routines that are less performance critical may be stored in a microcode ROM having a slower access time than a microcode ROM in which microcode routines that are more performance critical are stored.

Figure 2:
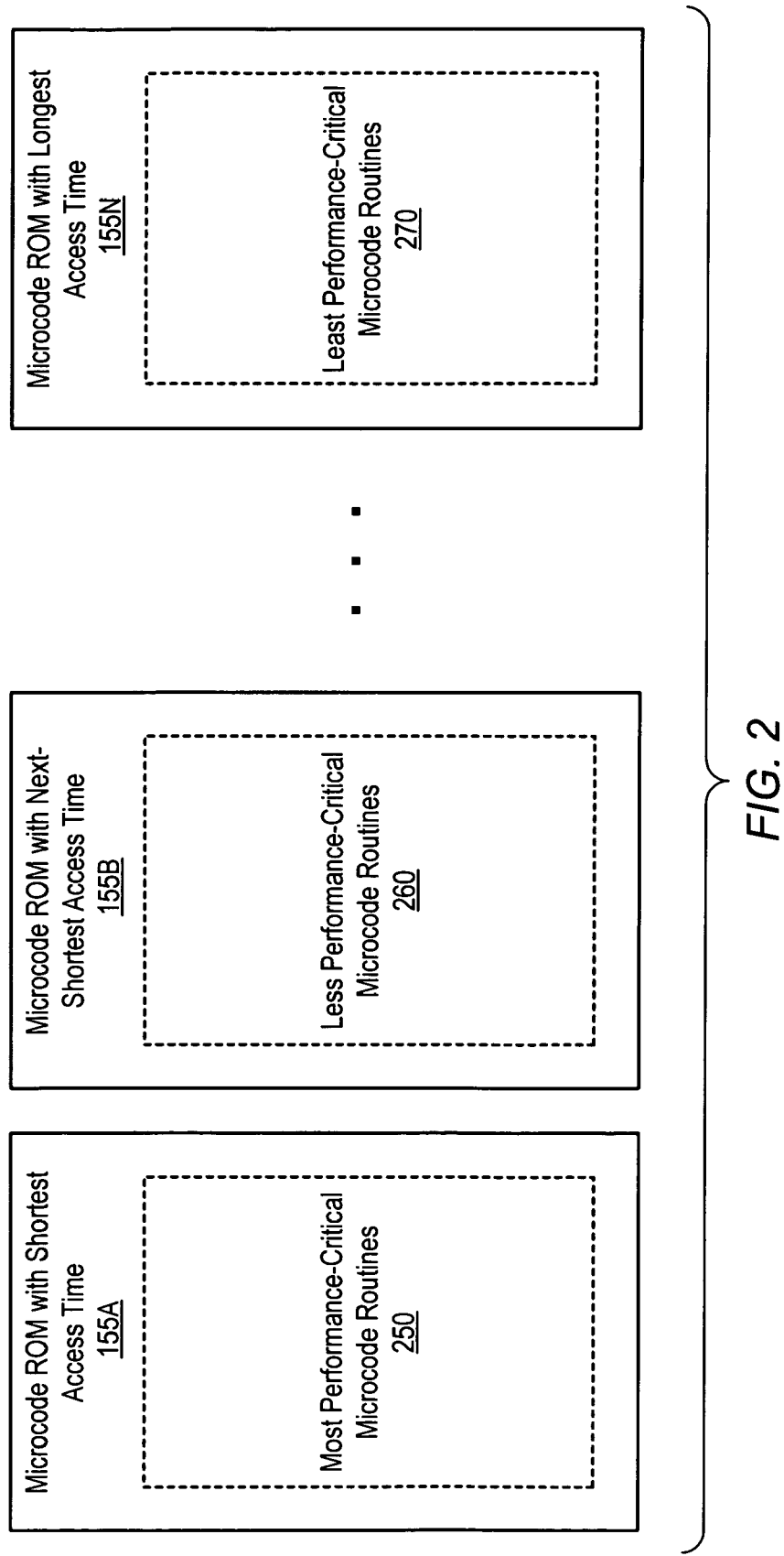
FIG. 2 illustrates one embodiment of a technique for storing microcode routines in multiple microcode ROMs.

FIG. 2 illustrates multiple microcode ROMs 155 that have different access times. Microcode ROM 155A may have the shortest access time and microcode ROM 155N may have the longest access time. The microcode routines stored by microcode ROMs 155 may be assigned degrees of performance criticality and divided into N groups corresponding to the N microcode ROMs such that each group contains microcode routines of similar relative performance criticality. By storing the group of microcode instructions with the highest degree of performance criticality in the microcode ROM with the shortest access time, storing the group of microcode instructions with the next highest degree of performance criticality in the microcode ROM with the next shortest access time, etc., processor efficiency may be improved. Likewise, the efficiency of any integrated circuit executing microcode routines stored in multiple microcode ROMs may be increased through this storage technique.

Figure 3:
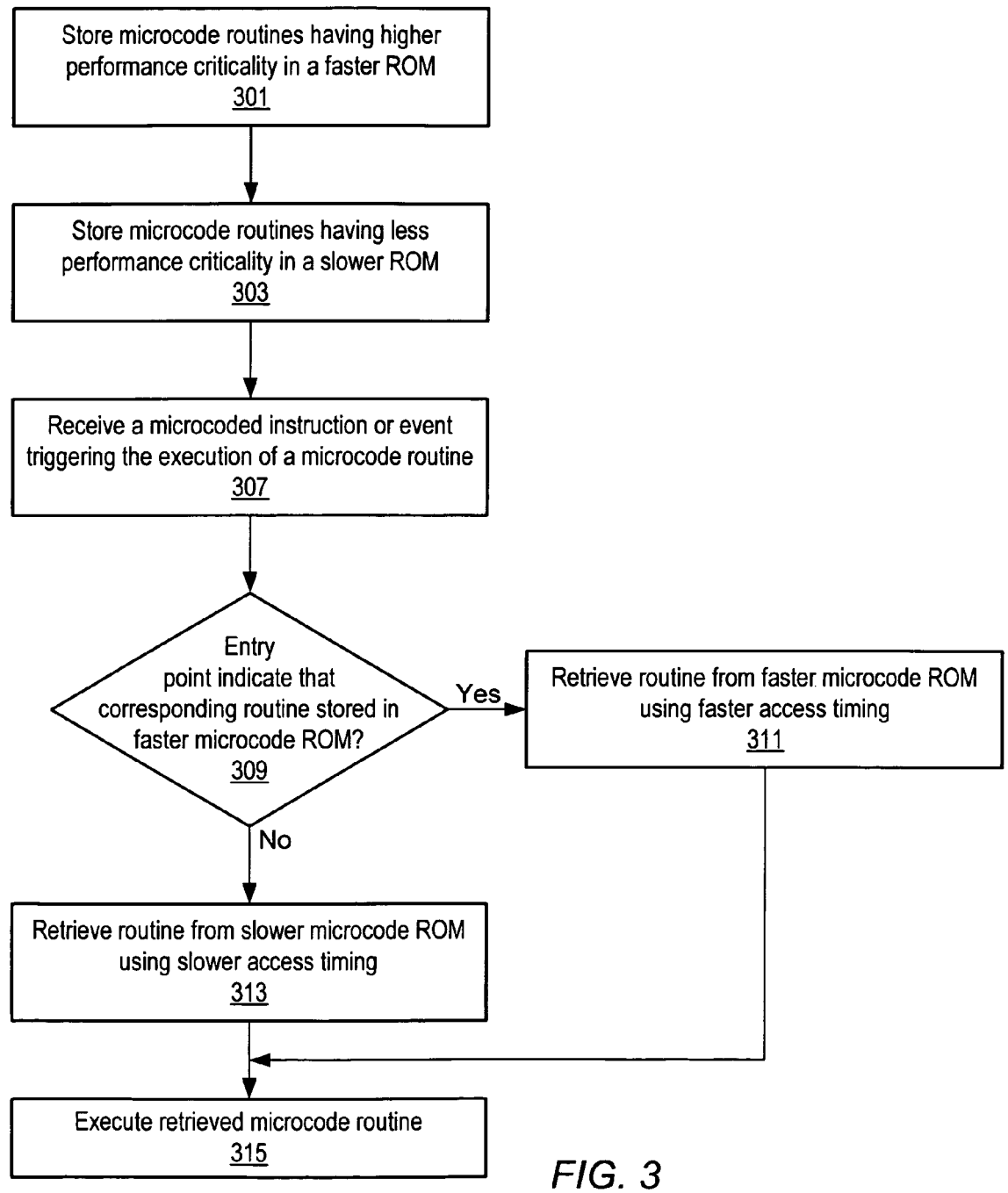
FIG. 3 is a flowchart of one embodiment of a method of operating an integrated circuit containing multiple microcode ROMs.

FIG. 3 is a flowchart of a method of operating an integrated circuit containing multiple independently accessible microcode ROMs, according to one embodiment. At 301, a microcode ROM with a relatively fast access time stores microcode routines that are more performance critical. Similarly, microcode routines that are less performance critical than those stored at 301 are stored in another, slower microcode ROM, as shown at 303. When a microcoded instruction is received or an event, which triggers the execution of a microcode routine occurs, as shown at 307, an entry point into microcode ROM may be generated for the microcode routine. The entry point may indicate which of the microcode ROMs contains that microcode routine. For example, different address ranges may be associated with each ROM, and thus the range that the entry point address falls within may indicate which ROM stores the microcode routine identified by that entry point.

As shown at 311, if the entry point indicates that the microcode routine is stored in the faster ROM, the microcode routine may be retrieved from the faster microcode ROM using faster access timing than is used to retrieve microcode routines from the slower microcode ROM, as shown at 313. For example, the faster microcode ROM may have an access time of one clock cycle and the slower microcode ROM may have an access time of two clock cycles. In such an embodiment, if the entry point indicates that the routine is stored in the faster microcode ROM, at least a portion of the microcode routine may be accessed from faster microcode ROM on the next clock cycle. If instead the entry point information indicates that the microcode routine is stored in microcode ROM, none of the microcode routine may be available until two cycles later. In some embodiments, NOPs may be dispatched during the cycles in which no microcode operations are available at the output of the slower microcode ROM. In either case, the retrieved microcode routine may be executed at 315.

Exemplary Computer Systems

Figure 4:
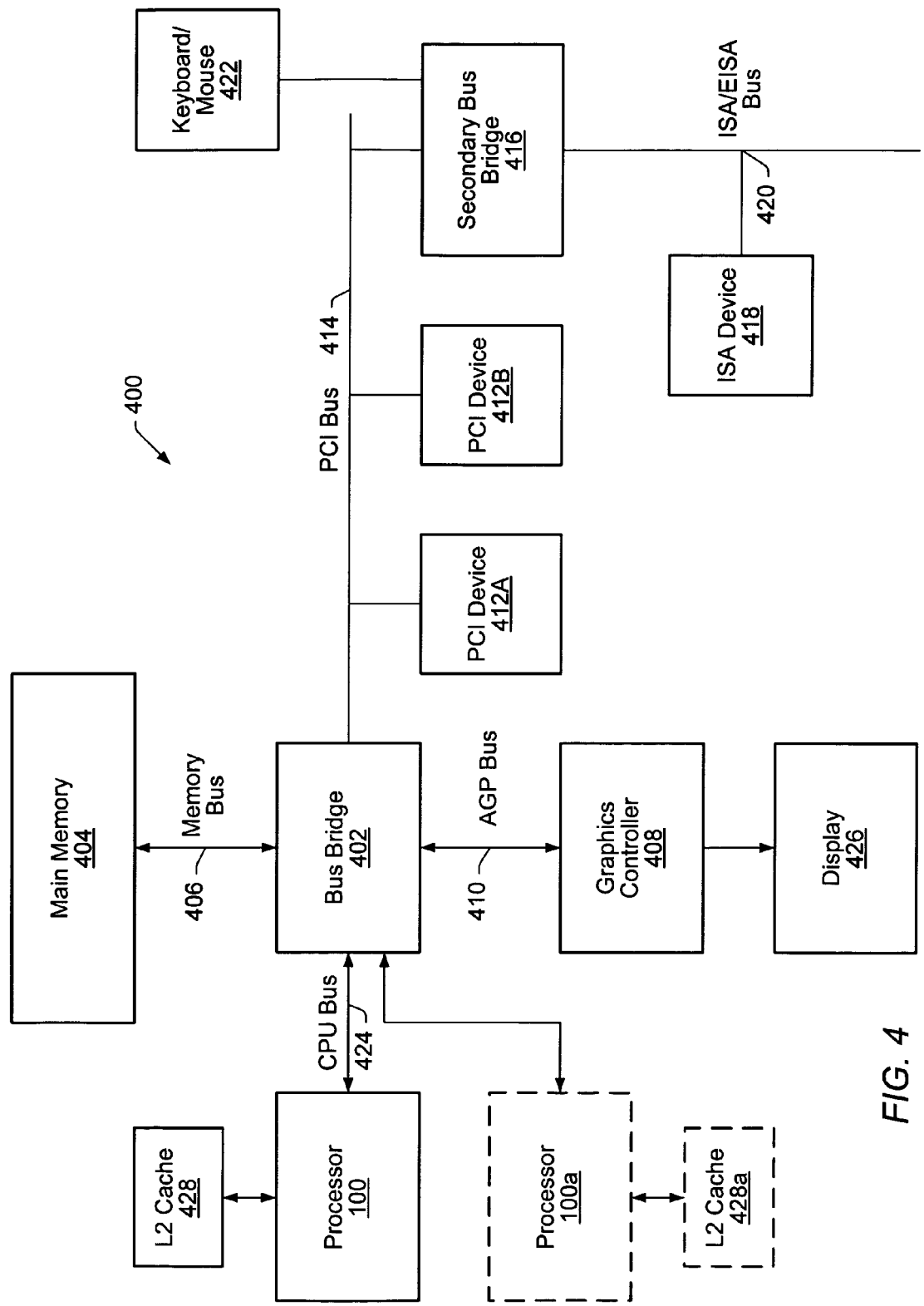
FIGS. 4 and 5 are block diagrams of exemplary computer systems that may include processors having multiple microcode ROMs, according to some embodiments.

FIG. 4 shows a block diagram of one embodiment of a computer system 400 that includes a processor 100 coupled to a variety of system components through a bus bridge 402. Computer system 400 may include integrated circuits (e.g., processor 100) that include multiple independently accessible microcode ROMs. The microcode ROMs may have different access times and may store microcode routines in such a way that more frequently used routines are stored in microcode ROM with shorter access time. Note that the illustrated embodiment is merely exemplary, and other embodiments of a computer system are possible and contemplated. In the depicted system, a main memory 404 is coupled to bus bridge 402 through a memory bus 406, and a graphics controller 408 is coupled to bus bridge 402 through an AGP bus 410. Several PCI devices 412A–412B are coupled to bus bridge 402 through a PCI bus 414. A secondary bus bridge 416 may also be provided to accommodate an electrical interface to one or more EISA or ISA devices 418 through an EISA/ISA bus 420. In this example, processor 100 is coupled to bus bridge 402 through a CPU bus 424 and to an optional L2 cache 428. In some embodiments, the processor 100 may include an integrated L1 cache (not shown).

Bus bridge 402 provides an interface between processor 100, main memory 404, graphics controller 408, and devices attached to PCI bus 414. When an operation is received from one of the devices connected to bus bridge 402, bus bridge 402 identifies the target of the operation (e.g., a particular device or, in the case of PCI bus 414, that the target is on PCI bus 414). Bus bridge 402 routes the operation to the targeted device. Bus bridge 402 generally translates an operation from the protocol used by the source device or bus to the protocol used by the target device or bus.

In addition to providing an interface to an ISA/EISA bus for PCI bus 414, secondary bus bridge 416 may incorporate additional functionality. An input/output controller (not shown), either external from or integrated with secondary bus bridge 416, may also be included within computer system 400 to provide operational support for a keyboard and mouse 422 and for various serial and parallel ports. An external cache unit (not shown) may also be coupled to CPU bus 424 between processor 100 and bus bridge 402 in other embodiments. Alternatively, the external cache may be coupled to bus bridge 402 and cache control logic for the external cache may be integrated into bus bridge 402. L2 cache 428 is shown in a backside configuration to processor 100. It is noted that L2 cache 428 may be separate from processor 100, integrated into a cartridge (e.g., slot 1 or slot A) with processor 100, or even integrated onto a semiconductor substrate with processor 100.

Main memory 404 is a memory in which application programs are stored and from which processor 100 primarily executes. A suitable main memory 404 includes DRAM (Dynamic Random Access Memory). For example, a plurality of banks of SDRAM (Synchronous DRAM) or Rambus DRAM (RDRAM) may be suitable.

PCI devices 412A–412B are illustrative of a variety of peripheral devices such as network interface cards, video accelerators, audio cards, hard or floppy disk drives or drive controllers, SCSI (Small Computer Systems Interface) adapters and telephony cards. Similarly, ISA device 418 is illustrative of various types of peripheral devices, such as a modem, a sound card, and a variety of data acquisition cards such as GPIB or field bus interface cards.

Graphics controller 408 is provided to control the rendering of text and images on a display 426. Graphics controller 408 may embody a typical graphics accelerator generally known in the art to render three-dimensional data structures that can be effectively shifted into and from main memory 404. Graphics controller 408 may therefore be a master of AGP bus 410 in that it can request and receive access to a target interface within bus bridge 402 to thereby obtain access to main memory 404. A dedicated graphics bus accommodates rapid retrieval of data from main memory 404. For certain operations, graphics controller 408 may further be configured to generate PCI protocol transactions on AGP bus 410. The AGP interface of bus bridge 402 may thus include functionality to support both AGP protocol transactions as well as PCI protocol target and initiator transactions. Display 426 is any electronic display upon which an image or text can be presented. A suitable display 426 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 400 may be a multiprocessing computer system including additional processors (e.g., processor 100a shown as an optional component of computer system 400). Processor 100a may be similar to processor 100. More particularly, processor 100a may be an identical copy of processor 100. Processor 100a may be connected to bus bridge 402 via an independent bus (as shown in FIG. 4) or may share CPU bus 224 with processor 100. Furthermore, processor 100a may be coupled to an optional L2 cache 428a similar to L2 cache 428.

Figure 5:
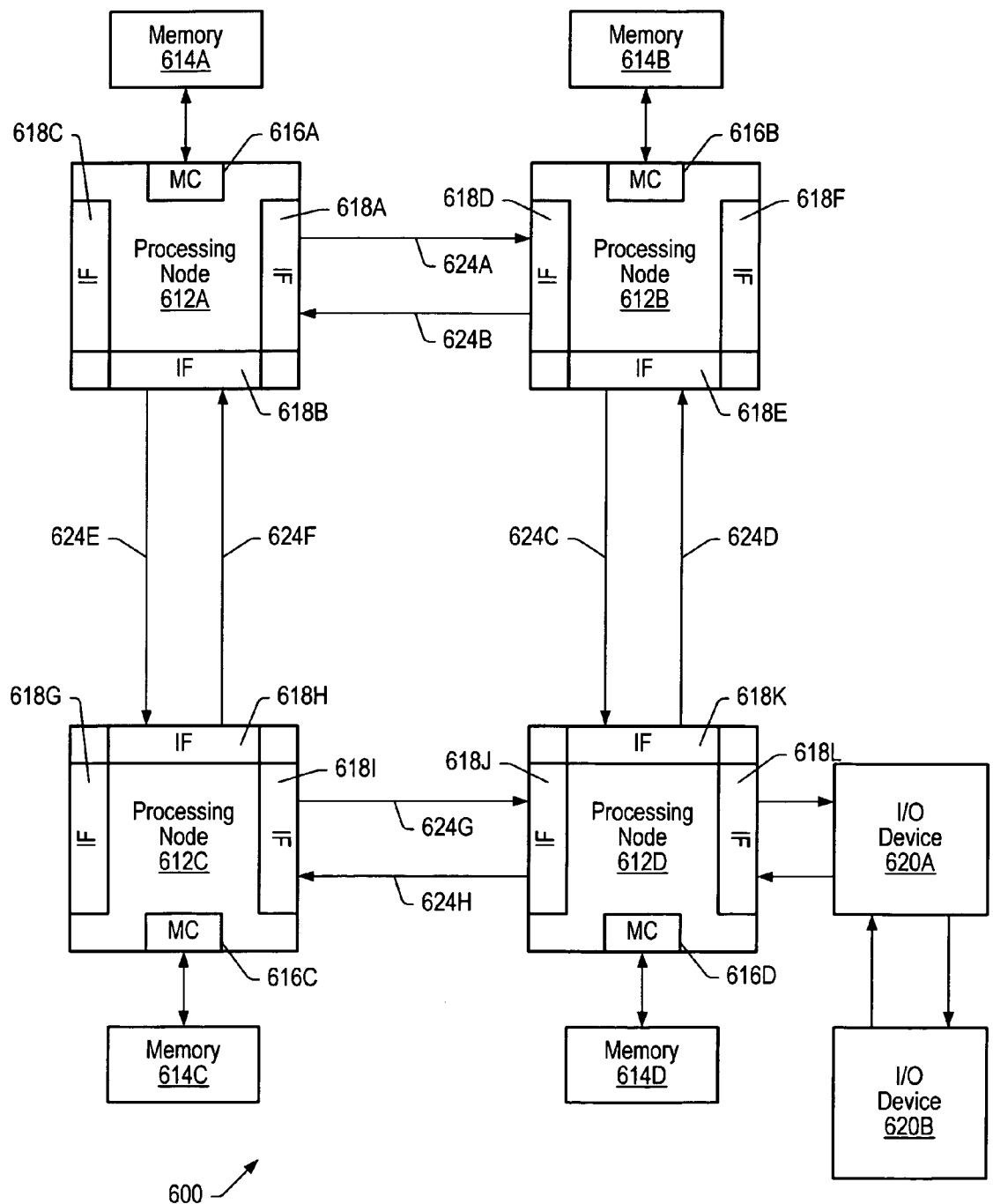

Turning now to FIG. 5, another embodiment of a computer system 400 that may include integrated circuits having multiple independently accessible microcode ROMs as described above is shown. Other embodiments are possible and contemplated. In the embodiment of FIG. 5, computer system 400 includes several processing nodes 612A, 612B, 612C, and 612D. Each processing node is coupled to a respective memory 614A–614D via a memory controller 616A–616D included within each respective processing node 612A–612D. Additionally, processing nodes 612A–612D include interface logic used to communicate between the processing nodes 612A–612D. For example, processing node 612A includes interface logic 618A for communicating with processing node 612B, interface logic 618B for communicating with processing node 612C, and a third interface logic 618C for communicating with yet another processing node (not shown). Similarly, processing node 612B includes interface logic 618D, 618E, and 618F; processing node 612C includes interface logic 618G, 618H, and 618I; and processing node 612D includes interface logic 618J, 618K, and 618L. Processing node 612D is coupled to communicate with a plurality of input/output devices (e.g., devices 620A–620B in a daisy chain configuration) via interface logic 618L. Other processing nodes may communicate with other I/O devices in a similar fashion.

Processing nodes 612A–612D implement a packet-based link for inter-processing node communication. In the present embodiment, the link is implemented as sets of unidirectional lines (e.g., lines 624A are used to transmit packets from processing node 612A to processing node 612B and lines 624B are used to transmit packets from processing node 612B to processing node 612A). Other sets of lines 624C–624H are used to transmit packets between other processing nodes as illustrated in FIG. 5. Generally, each set of lines 624 may include one or more data lines, one or more clock lines corresponding to the data lines, and one or more control lines indicating the type of packet being conveyed. The link may be operated in a cache coherent fashion for communication between processing nodes or in a non-coherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 612A to processing node 612D may pass through either processing node 612B or processing node 612C as shown in FIG. 5. Any suitable routing algorithm may be used. Other embodiments of computer system 400 may include more or fewer processing nodes then the embodiment shown in FIG. 5.

Generally, the packets may be transmitted as one or more bit times on the lines 624 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 612A–612D, in addition to a memory controller and interface logic, may include one or more microprocessors. Broadly speaking, a processing node includes at least one microprocessor and may optionally include a memory controller for communicating with a memory and other logic as desired. More particularly, each processing node 612A–612D may include one or more copies of microprocessor 100.

Memories 614A–614D may include any suitable memory devices. For example, a memory 614A–614D may include one or more RAMBUS DRAMs (RDRAMs), synchronous DRAMs (SDRAMs), static RAM, etc. The address space of computer system 400 is divided among memories 614A–614D. Each processing node 612A–612D may include a memory map used to determine which addresses are mapped to which memories 614A–614D, and hence to which processing node 612A–612D a memory request for a particular address should be routed. In one embodiment, the coherency point for an address within computer system 400 is the memory controller 616A–616D coupled to the memory storing bytes corresponding to the address. In other words, the memory controller 616A–616D is responsible for ensuring that each memory access to the corresponding memory 614A–614D occurs in a cache coherent fashion. Memory controllers 616A–616D may include control circuitry for interfacing to memories 614A–614D. Additionally, memory controllers 616A–616D may include request queues for queuing memory requests.

Interface logic 618A–618L may include a variety of buffers for receiving packets from the link and for buffering packets to be transmitted upon the link. Computer system 400 may employ any suitable flow control mechanism for transmitting packets. For example, in one embodiment, each interface logic 618 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 620A–620B may be any suitable I/O devices. For example, I/O devices 620A–620B may include devices for communicate with another computer system to which the devices may be coupled (e.g., network interface cards or modems). Furthermore, I/O devices 620A–620B may include video accelerators, audio cards, hard or floppy disk drives or drive controllers, SCSI (Small Computer Systems Interface) adapters and telephony cards, sound cards, and a variety of data acquisition cards such as GPIB or field bus interface cards. It is noted that the term "I/O device" and the term "peripheral device" are intended to be synonymous herein.

As used herein, the terms "clock cycle" or "cycle" refer to an interval of time in which the various stages of the instruction processing pipelines complete their tasks. Instructions and computed values are captured by memory elements (such as registers or arrays) according to a clock signal defining the clock cycle. For example, a memory element may capture a value according to the rising or falling edge of the clock signal.

Numerous variations and modifications will become apparent to those skilled in the art once the above disclosure is fully appreciated. It is intended that the following claims be interpreted to embrace all such variations and modifications.

What is claimed is:

1. An integrated circuit, comprising:
   a microcode unit configured to receive a microcoded instruction and, in response, to identify one of a plurality of microcode routines corresponding to the microcoded instruction; and
   a plurality of microcode ROMs fabricated within the same integrated circuit, coupled to the microcode unit and configured to collectively store the plurality of microcode routines, wherein at least one of the plurality of microcode ROMs is configured to output operations included in the microcode routine in response to the microcode unit identifying the microcode routine;
   wherein each of the plurality of microcode ROMs is independently accessible;
   wherein at least one of the plurality of microcode ROMs has a different access time than at least another one of the plurality of microcode ROMs; and
   wherein the plurality of microcode routines are stored in the plurality of microcode ROMs such that microcode routines having more performance criticality are stored in one of the plurality of microcode ROMs having a smaller access time than another one of the plurality of microcode ROMs in which microcode routines having less performance criticality are stored.

2. The integrated circuit of claim 1, wherein at least one of the plurality of microcode ROMs has a capacity that is different from at least another one of the plurality of microcode ROMs.

3. The integrated circuit of claim 1, wherein at least one of the plurality of microcode ROMs is implemented with transistors that have a different feature size than those used to implement at least another one of the plurality of microcode ROMs.

4. The integrated circuit of claim 1, wherein in response to the microcode unit identifying the microcode routine, a particular one of the plurality of microcode ROMs having a larger access time than another one of the plurality of microcode ROMs outputs operations included in the microcode routine during some operation cycles and not other operation cycles, and wherein, during cycles in which the particular microcode ROM does not output operations, the microcode unit is further configured to insert null operations into a stream of operations included in the microcode routine.

5. The integrated circuit of claim 1, wherein fewer than all of the microcode routines are stored in one of the plurality of microcode ROMs having a fastest access time.

6. The integrated circuit of claim 1, wherein microcode routines comprised in one subset of the plurality of the microcode routines are executed only during initialization of the integrated circuit, and wherein the microcode routines comprised in the subset are stored in one of the plurality of microcode ROMs having a slowest access time.

7. The integrated circuit of claim 1, further comprising a scheduler coupled to receive operations output from the plurality of microcode ROMs, wherein at least one of the plurality of microcode ROMs is located farther from the scheduler than at least another one of the plurality of microcode ROMs.

8. The integrated circuit of claim 1, wherein the access time for at least one of the plurality of microcode ROMs is one clock cycle.

9. The integrated circuit of claim 1, further comprising a scheduler and an execution unit, wherein the scheduler is configured to receive operations from the at least one microcode ROM having an access time of one clock cycle at a rate of at least one operation per clock cycle, wherein the execution unit is configured to receive operations from the scheduler at a rate of at least one operation per clock cycle and to complete execution of the operations at a rate of at least one operation per clock cycle.

10. The integrated circuit of claim 1, wherein at least one of the plurality of microcode ROMs consumes, on average, an amount of power that differs from at least another one of the plurality of microcode ROMs.

11. A computer system, comprising:
    a system memory; and
    a microprocessor coupled to the system memory, comprising:
       a microcode unit configured to receive a microcoded instruction and, in response, to identify one of a plurality of microcode routines corresponding to the microcoded instruction;
       a plurality of microcode ROMs fabricated within the same integrated circuit coupled to the microcode unit and configured to collectively store the plurality of microcode routines, wherein at least one of the plurality of microcode ROMs is configured to output operations included in the microcode routine in response to the microcode unit identifying the microcode routine, wherein each of the plurality of microcode ROMs is independently accessible;
       a scheduler coupled to receive the operations from the plurality of microcode ROMs and configured to issue the operations; and an execution unit coupled to receive the operations issued by the scheduler and configured to execute the operations received from the scheduler;

wherein at least one of the plurality of microcode ROMs has a different access time than at least another one of the plurality of microcode ROMs; and wherein the plurality of microcode routines are stored in the plurality of microcode ROMs such that microcode routines having more performance criticality are stored in one of the plurality of microcode ROMs having a smaller access time than another one of the plurality of microcode ROMs in which microcode routines having less performance criticality are stored.

12. The computer system of claim 11, wherein in response to the microcode unit identifying the microcode routine, a particular one of the plurality of microcode ROMs having a larger access time than another one of the plurality of microcode ROMs outputs operations included in the microcode routine during some operation cycles and not other operation cycles, and wherein, during cycles in which the particular microcode ROM does not output operations, the microcode unit is further configured to insert null operations into a stream of operations included in the microcode routine.

13. The computer system of claim 11, wherein at least one of the plurality of microcode ROMs has a capacity that is different from at least another one of the plurality of microcode ROMs.

14. The computer system of claim 11, wherein at least one of the plurality of microcode ROMs is implemented with transistors that have a different feature size than that used to implement at least another one of the plurality of microcode ROMs.

15. The computer system of claim 11, wherein at least one of the plurality of microcode ROMs is located farther from the scheduler than at least another one of the plurality of microcode ROMs.

16. The computer system of claim 11, wherein fewer than all of the microcode routines are stored in one of the plurality of microcode ROMs having a smallest access time.

17. The computer system of claim 11, wherein microcode routines comprised in one subset of the plurality of the microcode routines are executed only during initialization of the integrated circuit, and wherein the microcode routines comprised in the subset are stored in one of the plurality of microcode ROMs having a slowest access time.

18. The computer system of claim 11, wherein at least one of the plurality of microcode ROMs consumes, on average, a different amount of power from at least another one of the plurality of microcode ROMs.

19. The computer system of claim 11, wherein the access time for at least one of the plurality of microcode ROMs is one clock cycle.

20. A method, comprising:

receiving a microcoded instruction or event triggering execution of a particular one of a plurality of microcode routines;

identifying which one of a plurality of microcode ROMs stores the particular microcode routine, wherein each of the plurality of microcode ROMs is fabricated within the same integrated circuit, and wherein at least one of the plurality of microcode ROMs has a different access time than at least another one of the plurality of microcode ROMs;

retrieving the particular microcode routine by accessing the one of the plurality of microcode ROMs, wherein each of the plurality of microcode ROMs is independently accessible; and executing the microcode routine in response to said retrieving;

wherein the plurality of microcode routines are stored in the plurality of microcode ROMs such that microcode routines having more performance criticality are stored in one of the plurality of microcode ROMs having a smaller access time than another one of the plurality of microcode ROMs in which microcode routines having less performance criticality are stored.

21. The method of claim 20, wherein the identified one of the plurality of microcode ROMs has a larger access time than another one of the plurality of microcode ROMs and is configured to output operations included in the particular microcode routine during some operation cycles and not other operation cycles, and wherein retrieving the particular microcode routine from the identified one of the plurality of microcode ROMs includes, during cycles in which the particular microcode ROM does not output operations, inserting null operations into a stream of operations included in the microcode routine.

22. The method of claim 20, wherein at least one of the plurality of microcode ROMs is implemented with transistors that have a different feature size than those used to implement another one of the plurality of microcode ROMs.

23. The method of claim 20, wherein if the microcode routine is stored in a faster one of the plurality of microcode ROMs, said retrieving comprises retrieving the microcode routine using faster access timing than is used when retrieving microcode routines from a slower one of the plurality of microcode ROMs.

24. The method of claim 20, wherein at least one of the plurality of microcode ROMs has a capacity that is different from another one of the plurality of microcode ROMs.

25. An integrated circuit, comprising:

a plurality of independently accessible microcode ROMs configured to collectively store a plurality of microcode routines, wherein each of the plurality of microcode ROMs is fabricated within the same integrated circuit, wherein at least one of the plurality of microcode ROMs has a different access time than at least another one of the plurality of microcode ROMs, and wherein the plurality of microcode routines are stored in the plurality of microcode ROMs such that microcode routines having more performance criticality are stored in one of the plurality of microcode ROMs having a smaller access time than another one of the plurality of microcode ROMs in which microcode routines having less performance criticality are stored;

means for identifying which one of a plurality of microcode ROMs stores one of the plurality of microcode routines and retrieving the one of the plurality of microcode routines from the one of the plurality of microcode ROMs; and means for executing the one of the plurality of microcode routines in response to the means for identifying, retrieving the one of the plurality of microcode routines from the one of the plurality of microcode ROMs.

* * * * *